United States Patent
Kelley et al.

(10) Patent No.: US 6,581,141 B1
(45) Date of Patent: Jun. 17, 2003

(54) TOGGLE FOR SPLIT TRANSACTION MODE OF PCI-X BRIDGE BUFFER

(75) Inventors: Richard Allen Kelley, Apex, NC (US); Danny Marvin Neal, Round Rock, TX (US); Adalberto Guillermo Yanes, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,045

(22) Filed: May 18, 1999

(51) Int. Cl.⁷ .............................................. G06F 13/16
(52) U.S. Cl. .......................... 711/154; 710/57; 710/310
(58) Field of Search ...................... 711/154, 1; 710/29, 710/36, 39, 56, 57, 310

(56) References Cited

U.S. PATENT DOCUMENTS

| | | | | |
|---|---|---|---|---|
| 6,026,451 A | * | 2/2000 | Sreenivas | 710/57 |
| 6,421,756 B1 | * | 7/2002 | Kelley et al. | 710/56 |
| 6,425,024 B1 | * | 7/2002 | Kelley et al. | 711/154 |
| 6,457,077 B1 | * | 9/2002 | Kelley et al. | 710/56 |

FOREIGN PATENT DOCUMENTS

| | | |
|---|---|---|
| JP | 61-283952 | 12/1986 |
| JP | 03-278156 | 12/1991 |
| JP | 06-175971 | 6/1994 |
| JP | 07-191935 | 7/1995 |

OTHER PUBLICATIONS

PCI–X Addendum to the PCI Local Bus Specification, Sep. 22, 1999.*
PCI–X and Mini PCI Specification to Become Addenda to PCI Local B us Standard, [Online] http://www.pcisig.com/news_room/news/press_releases, Apr. 5, 1999.*
Companies release details of PCI–X standard, Journal Record, Oklahoma City, Sep. 10, 1998.*
Translation of JA 61–283952 dated Nov. 2002.*
Translation of JA 03–278156 dated Nov. 2002.*
Machine assisted translation of JA 06–175971.*

* cited by examiner

Primary Examiner—Matthew Kim
Assistant Examiner—Yamir Encarnación
(74) Attorney, Agent, or Firm—Mark E. McBurney; Bracewell & Patterson, L.L.P.

(57) ABSTRACT

A system and method for optimally processing split request transactions across a PCI-X bridge with a PCI-X bridge buffer. The split transaction mode of the PCI-X bridge buffer is toggled between a No Over-commit mode and an over-commit mode. Over-commitment of the buffer is inhibited when the split transaction mode is toggled to the No Over-commit mode and when the buffer is over committed by the bridge. At least some over-commitment of the buffer is allowed by the bridge when the split transaction mode is toggled to the over-commit mode and when the buffer is not over committed by the bridge. The over-commit mode may be an Over-commitment mode or a Flood mode. The Over-commitment mode allows some degree of over commitment of the buffer by the bridge while the Flood mode allows the bridge to forward all split request transactions regardless of size of the transactions or amount of available space in the buffer when the Over-commit mode is in a Flood mode. The split request transaction is controlled and forwarded based on the toggled split transaction mode. The system comprises at least a toggle switch and a control system. The split transaction mode is toggled to or maintained at a particular mode based on whether a retry or disconnect of the split completion transaction by the PCI-X bridge has or has not occurred and whether the buffer is or is not over committed.

17 Claims, 2 Drawing Sheets

TOGGLE FOR SPLIT TRANSACTION MODE OF PCI-X BRIDGE BUFFER

BACKGROUND OF THE INVENTION

1. Technical Field

The present invention relates in general to a toggle for the split transaction mode of a PCI-X bridge buffer and in particular to a toggle for switching the split transaction mode between a "No Over-commitment" Mode and an "Over-Commitment" Mode or a "Flood" Mode for split read transactions across a PCI-X to PCI-X (PtP) bridge. Still more particularly, the present invention relates to toggling and switching the split transaction mode of the PCI-X bridge buffer so that retries and disconnects are generally minimized by the PCI-X bridge and bus efficiency and overall system performance is thus improved.

2. Description of the Related Art

Peripheral Component Interconnect-X (PCI-X) and peripheral component interconnect (PCI) specifications have been developed and continued to be improved for communicating between a host computer and various devices or adapters, such as devices on the bus, plug-in cards, or integrated adapters. The specifications for PCI have been detailed in PCI specification version 2.2 (66 MHz capability) published in December 1998 and PCI specification version x.x (133 MHz capability that will be published some time after development of the PCI-X enhancements have been completed and approved. These specifications are incorporated by reference herein.

Various transactions, such as input/output (I/O) transactions, occur across the PCI-X or PCI bridge between the host computer and the various devices. Delay transactions across such bridges require retries by the host bridge until the appropriate amount of buffer space is readily available. However, the problem with delay transactions (described in the current PCI specification) is that the host bridge has to continue to retry and wait until appropriate buffers are available-which results in the tie up or back up of transactions across the host bridge. Split transactions (supported by the PCI-X enhancements) across such bridges avoids having the host bridge wait and retry transactions and allows commands to be processed based on commands by the master.

The PCI-X bus specification allows for three different modes for managing split transactions for a PCI-X to PCI-X (PtP) bridge. These modes are a "No Over-commitment" Mode, an "Over-Commitment" Mode, and a "Flood" Mode. Generally, the upstream (bus transactions going towards system memory) and downstream (bus transactions going towards an I/O device) split transaction control registers each have two types of fields for controlling the forwarding of split requests. The two types of fields are Split Completion Capacity fields and a Split-Transaction Commitment Limit fields. A Split Completion Capacity field indicates the amount of space in the buffers that the bridge has available for storing split completions. A Split Transaction Commitment Limit field indicate the number of Split Transactions that the bridge is permitted to have outstanding at one time (in units of ADQs, which are each a data block of 128 bytes). If the bridge is configured to store Split Read Completions separately from Split Write Completions, then the Split Transaction Commitment Limit field applies only to split read requests. On the other hand, if the bridge is configured to store Split Read Completions with Split Write Completions, then the Split Transaction Commitment field applies to all split transactions.

The "No Over-commitment" mode occurs when the Split Transaction Commitment Limit field is equated to the same value as the Split Transaction Capacity field. Typically, the Split Transaction Commitment Limit field is defaulted at this value. At this setting value, the bridge forwards Split Completions which identically fill and occupy the bridge buffers. For example, the bridge is unable to issue a split read request unless the bridge has available the full amount of buffer space that would be able to accept the entire read completion in one bus operation. The "Over-commitment" mode occurs when the Split Transaction Commitment Limit field is programmed to a value greater than the value of the Split Transaction Capacity field. In this situation, the bridge is able to forward more Split Transactions (in unit of ADQs) than its available completion buffer capacity. In other words, the "Over-commitment" mode allows some degree of over-commitment by the bridge of read completion buffers (degree of over-commitment is programmable), wherein throughput of transactions is improved and latency is reduced. The "Flood" mode occurs when the Split Transaction Commitment Limit field allows the bridge to forward all Split Transactions regardless of the size of the transaction or the amount of available buffer space in the bridge. In other words, the "Flood" mode allows the bridge to forward all read requests regardless of available buffers.

Therefore, one of the keys for managing transactions across the bridge is to optimize the settings for the split Transaction Commitment Limit fields, which are a function of the number and behavior of devices. If the commitment level for the Split Transaction Commitment Limit field is set to be too large, then Split Completion data returns to the bridge faster than it is able to be forwarded to the requester resulting in the Split Completion backing up towards the completer. On the other hand, if the commitment level for the Split Transaction Commitment Limit field is set to be too small, then Split Requests are unnecessarily delayed and requesters on one side of the bridge experience additional latency when reading from completers on the other side of the bridge.

The problem occurs when the split transaction mode is set to the Over-commitment mode or the Flood mode. When peak traffic occurs on the secondary side of the bridge, the bridge's read completions buffers become full of completion data which results in any additional read completions in transit above the PtP bridge backing up in the bridge above the PtP bridge and which also results in larger split completions being decomposed into smaller read completions. When the bridge has some available buffers, the bridge will accept part of a split read completion filling the available buffers and then disconnecting. Over-commitment of the buffers in the bridge results in retries and disconnects of the Split Completion transactions occurring more frequently at and tying up the bridge. Thus, bus efficiency and overall system performance are affected.

It would therefore be advantageous and desirable to inhibit the over-commitment of the buffers in the bridges to minimize retries and disconnects at the bridge and increase bus efficiency and overall system performance. It would also be advantageous and desirable to provide a system and method that toggles the split transaction mode to the No Over-commitment mode to stop the bridge from issuing any additional read requests until the bridge is no longer over-committed. It would also be advantageous and desirable to provide a system and method for toggling the split transaction mode from the Over-commitment mode or the Flood mode to the No Over-commitment mode when the peak traffic and backing up of split completions, such as read completions, in transit above the PtP bridge occur. It would be advantageous and desirable to provide a system and method for allowing split completions, such as read completions, to drain out of the bridge until the completion buffers in the bridge are no longer over committed at which time the split transaction mode is toggled back to the Over-commitment mode or the Flood mode.

SUMMARY OF THE INVENTION

It is therefore one object of the present invention to inhibit the over-commitment of the buffers in the bridges to minimize retries and disconnects at the bridge and increase bus efficiency and overall system performance.

It is another object of the present invention to provide a system and method that toggles the split transaction mode of a bridge to the No Over-commitment mode to stop the bridge from issuing any additional read requests until the bridge is no longer over-committed.

It is a further object of the present invention to provide a system and method for toggling the split transaction mode from the Over-commitment mode or the Flood mode to the No Over-commitment mode when the peak traffic and backing up of split completions, such as read completions, in transit above the PtP bridge occur.

It is still a further object of the present invention to provide a system and method for allowing split completions, such as read completions, to drain out of the bridge until the completion buffers in the bridge are no longer over committed at which time the split transaction mode is toggled back to the Over-commitment mode or the Flood mode.

The foregoing objects are achieved as is now described. A system and method for optimally processing split completion transactions across a PCI-X bridge with a PCI-X bridge-buffer. The split transaction mode of the PCI-X bridge buffer is toggled between a No Over-commit made and an over-commit mode. Over-commitment of the buffer is inhibited when the split transaction mode is toggled to the No Over-commit mode and when the buffer is over committed by the bridge. At least some over-commitment of the buffer is allowed by the bridge when the split transaction mode is toggled to the over-commit mode and when the buffer is not over committed by the bridge. The over-commit mode may be an Over-commitment mode or a Flood mode. The Over-commitment mode allows some degree of over commitment of the buffer by the bridge while the Flood mode allows the bridge to forward all split request transactions regardless of size of the transactions or amount of available space in the buffer when the Over-commit mode is in a Flood mode. The split request transaction is controlled and forwarded based on the toggled split transaction mode. The system comprises at least a toggle switch and a control system. The split transaction mode is toggled to or maintained at a particular mode based on whether a retry or disconnect of the split completion transaction by the PCI-X bridge has or has not occurred and whether the buffer is or is not over committed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
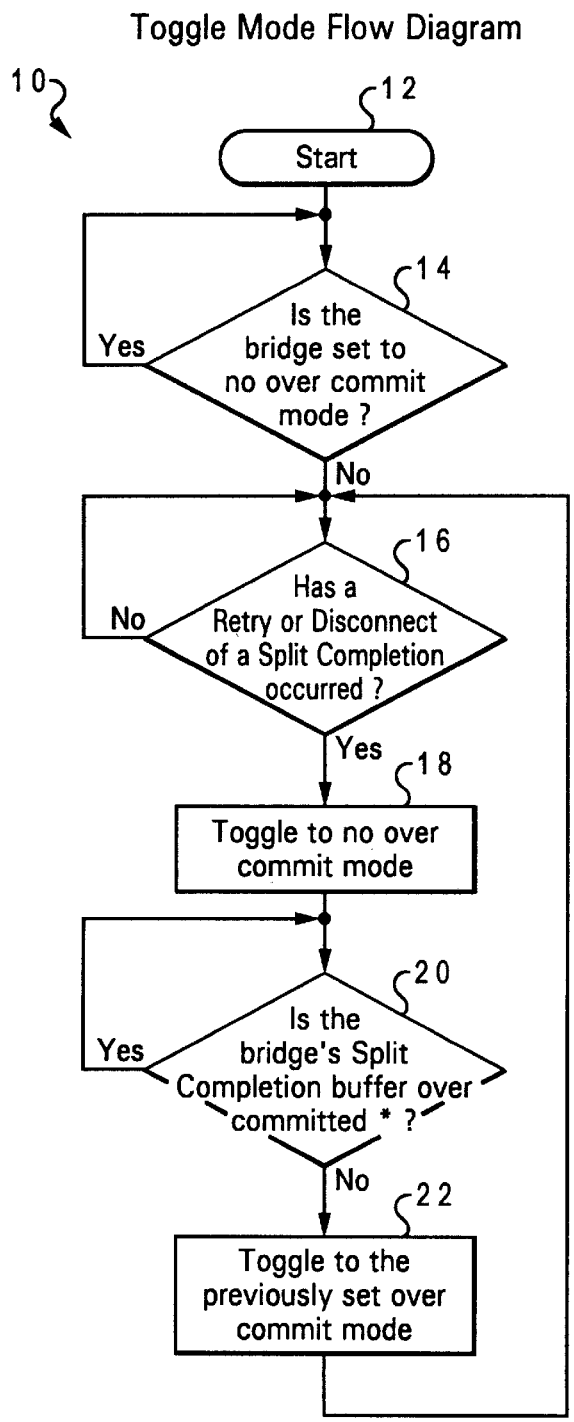
FIG. 1 is a flow chart of an algorithm for toggling or switching the split transaction mode of a PCI-X to PCI-X (PtP) bridge buffer between a "No Over-commitment" Mode and an "Over-Commitment" Mode or a "Flood" Mode for split transactions across the bridge.
Figure 2:
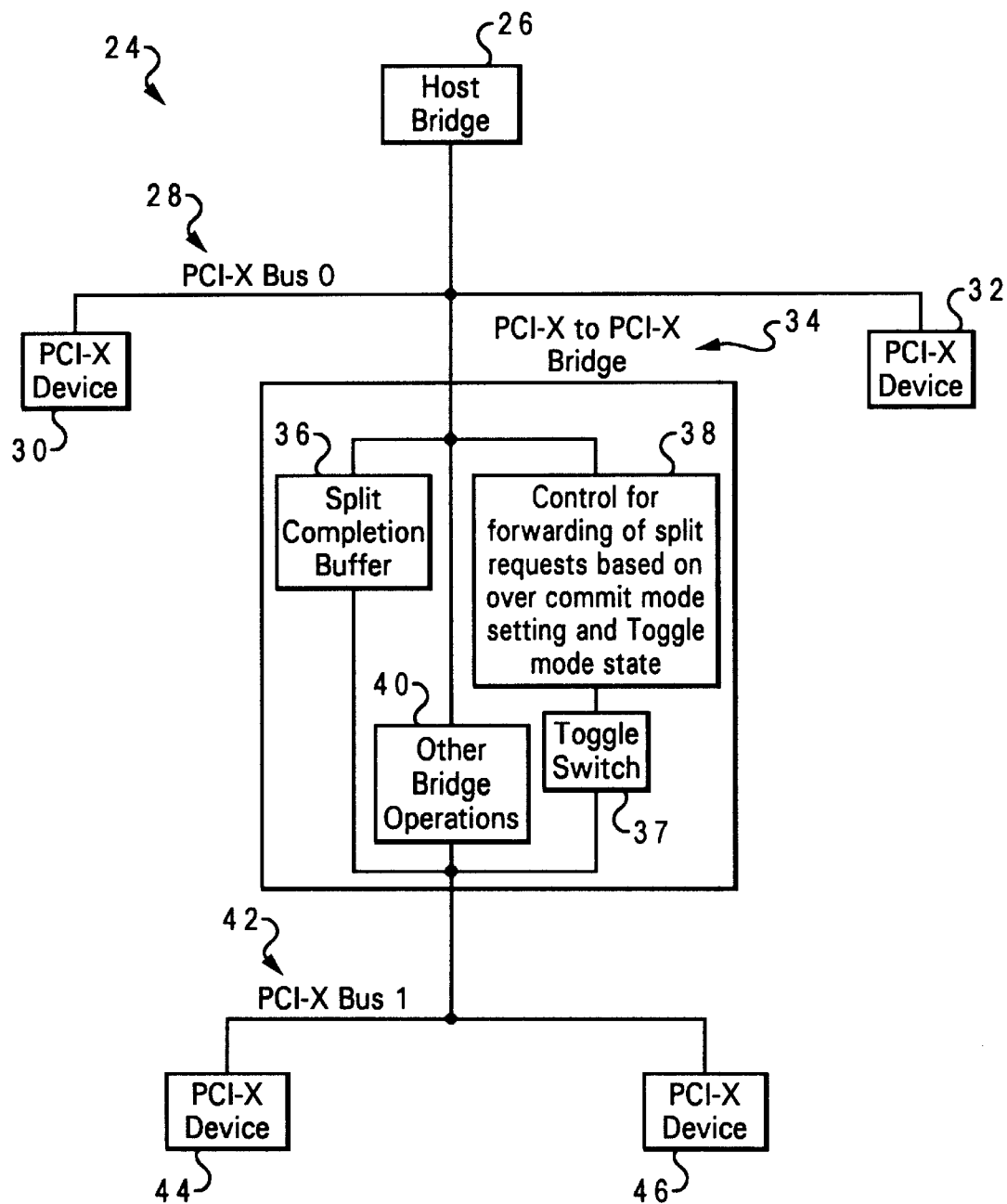
FIG. 2 is a block diagram of a system for toggling or switching the split transaction mode of a PCI-X to PCI-X (PtP) bridge buffer between a "No Over-commitment" Mode and an "Over-Commitment" Mode or a "Flood" Mode for split transactions across the bridge.

The present invention provides a system 24 and a method 10 for toggling the split transaction mode of a PCI-X bridge buffer (See FIGS. 1 and 2). The system 24 and the method 10 provide a toggle for switching the split transaction mode of a PCI-X to PCI-X (PtP) bridge 34 between a "No Over-commitment" Mode and an "Over-Commitment" Mode or a "Flood" Mode for split transactions across the bridge 34.

The system 24 and the method 10 toggle and switch the split transaction mode of the PCI-X bridge buffer so that retries and disconnects are generally minimized by the PCI-X bridge 34 and bus efficiency and overall system performance is thus improved. The present system 24 and the method 10 inhibit the over-commitment of the split completion buffers 36 in the bridge 34 to minimize retries and disconnects at the bridge 34. The present system 24 and the method 10 toggles the split transaction mode to the No Over-commitment mode to stop the bridge 34 from issuing any additional read requests until the bridge 34 is no longer over-committed, that is, the present system 24 and the method 10 toggles the split transaction mode from the Over-commitment mode or the Flood mode to the No Over-commitment mode when the peak traffic and backing up of split completions, such as read completions, in transit above the PCI-X bridge 34 occur. The present system 24 and method 10 allows split completions, such as read completions, to drain out of the bridge 34 until the completion buffers 36 in the bridge 34 are no longer over committed at which time the split transaction mode is toggled back to the Over-commitment mode or the Flood mode.

With reference now to the figures and in particular with reference to FIG. 1, a method or algorithm 10 for toggling or switching the split transaction mode of a PCI-X bridge buffer(s) 36 between a "No Over-commitment" Mode and an "Over-Commitment" Mode or a "Flood" Mode for split transactions across a PCI-X to PCI-X (PtP) bridge 34 is shown. The method 10 starts at block 12. The method 10 moves to decision block 14 where it is determined whether the split transaction mode of the bridge 34 is set to the "No Over-commitment" mode. If the split transaction mode of the bridge 34 is set to the "No Over-commitment" mode, then the method 10 loops back before the decision block 14 to continue to determine whether the bridge 34 is maintained as being set on the "No Over-commitment" mode. On the other hand, if the split transaction mode of the bridge 34 is not set to the "No Over-commitment" mode and is set to either the "Over-commitment" mode or the "Flood" mode, then the method 10 moves to decision block 16.

At decision block 16, the method 10 determines whether a retry or a disconnect of a split completion at the bridge 34 has occurred. If such a retry or disconnect has not occurred, then the method 10 loops back before the decision block 16 to continue to determine whether such retry or disconnect has occurred, and the method 10 continues to maintain the split transaction mode of the bridge 34 to the set over-commit mode, such as the "Over-commitment" mode or the "Flood" mode, allowing the bridge 34 to continue to over-commit its buffer(s) 36 with split completion transactions. If such a retry or disconnect has occurred, then the method 10 moves to block 18. At block 18, the method 10 toggles the split transaction mode of the bridge 34 from the over-commit mode, such as the "Over-commitment" mode or the "Flood" mode, to the "No Over-commitment" mode, and the bridge 34 is inhibited from over-committing its buffer(s) 36 with split request transactions. The method 10 then moves to decision block 20.

At decision block 20, the method 10 determines whether split-completion buffer(s) 36 of the bridge 34 is/are over-committed. If the buffer(s) 36 is/are over-committed, then the method 10 loops back before block 20 to continue to determine whether the buffer(s) 36 is/are over-committed, and the method 10 maintains the split transaction mode in the "No Over-commitment" mode inhibiting over-commitment by the bridge 34 of the buffer(s) 36. On the other hand, if the buffer(s) 36 is/are not over-committed, that is, buffer(s) 36 has/have drained but and become available in the bridge 34, then the method 10 moves to block 22 where the split transaction mode is toggled from the "No Over-commitment" mode to the previously set over-commit mode, which was either the "Over-commitment" mode or the "Flood" mode. At this point, the bridge 34 is accordingly allowed to over-commit its buffer(s) 36 with split request transactions. The method 10 then loops back before decision block 16.

With reference now to the figures and in particular with reference to FIG. 2, a system 24 for toggling or switching the split transaction mode of a PCI-X bridge buffer(s) 36 between a "No Over-commitment" Mode and an over-commit mode, such as an "Over-Commitment" Mode or a "Flood" Mode, for split transactions across a PCI-X to PCI-X (PtP) bridge 34 is shown. The system 24 shows a host bridge 26 interfaced and in communications with a PCI-X bus 28. PCI-X devices 30 and 32 are coupled to and interfaced with the bus 28. A PCI-X to PCI-X (PtP) bridge 34 links and provides communications between the bus 28 and another PCI-X bus 42. PCI-X devices 44 and 46 are coupled to and interfaced with the bus 42. The bridge 34 allows communications between the host bridge 26 and the PCI-X devices 30, 32 and the PCI-X devices 44, 46.

The bridge 34 has split completion buffer(s) 36, a toggle switch 37 for controlling, switching, and setting the split transaction mode of the bridge 34, a control 38 for forwarding split request transactions based on the setting of the split transaction mode by a toggle 37, and other bridge operations sub-system 40. The toggle switch 37 controls, switches, and sets the split transaction mode of the bridge 34 between the "No Over-commitment" mode and an over-commit mode, such as the "Over-commitment" mode or the "Flood" mode. The control 38 accordingly forwards split request transactions based on the setting of the split transaction mode of the bridge 34. The other bridge operations sub-system 40 allows other bridge operations to be executed or to occur between the host bridge 26 and the buses 28 and 42 which have the respective interfaced devices 30, 32 and 44, 46.

Thus, the present invention discloses a toggle for the split transaction mode of a PCI-X bridge buffer and in particular to a toggle for switching and setting the split transaction mode of a bridge between a "No Over-commitment" Mode and an over-commit mode, such as an "Over-Commitment" Mode or a "Flood" Mode, for split read transactions across a PCI-X bridge.

While the invention has been particularly shown and described with reference to a preferred embodiment, it will be understood by those skilled in the art that various changes in form and detail may be made therein without departing from the spirit and scope of the invention.

What is claimed is:

1. A method for managing a split transaction mode of a PCI-X bridge buffer when a PCI-X bridge is processing a split request transaction, said method comprising:

determining whether the split transaction mode is in a No Over-commitment mode, maintaining the split transaction mode in the No Over-commitment mode if the split transaction mode has been set in the No Over-commitment mode, determining whether a retry or disconnect of the split completion transaction by the PCI-X bridge has occurred if the split transaction mode has been set in an over-commit mode, maintaining the split transaction mode in the over-commit mode if the retry or disconnect has not occurred, switching and setting the split transaction mode to the No Over-commitment mode if the retry or disconnect has occurred, determining whether the PCI-X bridge buffer has been over committed, maintaining the split transaction mode in the No Over-commitment mode if the PCI-X bridge has been over committed, and switching and setting the split transaction mode to the over-commit mode if the PCI-X bridge is not over committed.

2. The method according to claim 1 wherein:

the No Over-commitment mode is a mode in which over commitment of the buffer by the bridge is inhibited.

3. The method according to claim 1 wherein:

the over-commit mode is an Over-commitment mode that allows over commitment of the buffer by the bridge.

4. The method according to claim 1 wherein:

the over-commit mode is a Flood mode that allows the bridge to forward all split request transactions regardless of size of the transactions or amount of available space in the buffer.

5. A method of optimally processing split request transaction across a PCI-X bridge with a PCI-X bridge buffer, said method comprising:

toggling a split transaction mode of the PCI-X bridge buffer between a No Over-commit mode and an over-commit mode, and inhibiting over-commitment of the buffer by the bridge when the split transaction mode is toggled to the No Over-commit mode and when the buffer is over committed by the bridge, and allowing at least some over-commitment of the buffer by the bridge when the split transaction mode is toggled to the over-commit mode and when the buffer is not over committed by the bridge.

6. The method according to claim 5 further comprising the step of:

controlling and forwarding the split request transaction based on the split transaction mode.

7. The method according to claim 5 wherein:
the No Over-commit mode is a mode in which over commitment of the buffer by the bridge is inhibited.

8. The method according to claim 6 wherein the forwarding and controlling step further comprises the step of:
inhibiting forwarding by the bridge of any further split request transaction when the buffer is over committed by the bridge.

9. The method according to claim 5 wherein:
the over-commit mode is an Over-commitment mode that allows over commitment of the buffer by the bridge.

10. The method according to claim 6, wherein the forwarding and controlling step further comprises the step of:
forwarding by the bridge of some split request transactions when the buffer is not over committed by the bridge.

11. The method according to claim 6 wherein:
the over-commit mode is a Flood mode that allows the bridge to forward all split request transactions regardless of size of the transactions or amount of available space in the buffer.

12. The method according to claim 11 wherein the forwarding and controlling step further comprises the step of:
the bridge forwarding all split request transactions when the buffer is not over committed by the bridge.

13. A system for optimally processing split completion transaction across a PCI-X bridge with a PCI-X bridge buffer, said system comprising:
a mode control coupled to the buffer of the bridge, wherein the mode control toggles a split transaction mode of the PCI-X bridge buffer between a No Over-commit Mode when the buffer is over committed by the bridge and an Over-commit Mode when the buffer is not over committed by the bridge, and
a control system coupled to the mode control and the buffer, wherein the control system forwards split request transactions based on the split transaction mode.

14. The system according to claim 13 wherein:
the control system inhibits over-commitment of the buffer by the bridge when the split transaction mode is the No Over-commit mode.

15. The system according to claim 13 wherein:
the control system allows at least some over-commitment of the buffer by the bridge when the split transaction mode is the Over-commit mode.

16. The system according to claim 15 wherein:
the control system allows the bridge to forward all split request transactions regardless of size of the transactions or amount of available space in the buffer when the Over-commit mode is a Flood mode.

17. The system according to claim 13, and further comprising:
a bridge operations sub-system within the bridge that is capable of interfacing with a host bridge to provide other bridge operations through the bridge.

* * * * *